(12) United States Patent
Tinnin et al.

(10) Patent No.: US 9,278,706 B2
(45) Date of Patent: Mar. 8, 2016

(54) TELESCOPING STEERING COLUMN

(71) Applicant: STEERING SOLUTIONS IP HOLDING CORPORATION, Saginaw, MI (US)

(72) Inventors: Melvin L. Tinnin, Clio, MI (US); Donald A. Buzzard, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 66 days.

(21) Appl. No.: 14/319,761

(22) Filed: Jun. 30, 2014

(65) Prior Publication Data

US 2015/0375771 A1 Dec. 31, 2015

(51) Int. Cl.
*B62D 1/185* (2006.01)
*G05G 5/04* (2006.01)

(52) U.S. Cl.
CPC . *B62D 1/185* (2013.01); *G05G 5/04* (2013.01)

(58) Field of Classification Search
CPC .................................. B62D 1/85; G05G 5/04

USPC .............................................. 74/493; 280/771
See application file for complete search history.

(56) References Cited

U.S. PATENT DOCUMENTS

| 5,537,890 | A * | 7/1996 | Thomas | B62D 1/184 280/775 |
|---|---|---|---|---|
| 7,430,847 | B2 * | 10/2008 | Hoffman | A01D 34/69 180/19.3 |
| 8,997,602 | B2 * | 4/2015 | Tanaka | B62D 1/184 280/775 |
| 2014/0109714 | A1 | 4/2014 | Bodtker | |

* cited by examiner

*Primary Examiner* — Karen Beck
(74) *Attorney, Agent, or Firm* — Cantor Colburn LLP (57) ABSTRACT

In one exemplary embodiment of the present invention, a telescope stop assembly for a steering column having a jacket is provided. The assembly includes a cam having a cam surface, the cam rotatable between a locked position and an unlocked position, and a pin operatively associated with the cam. The cam surface acts on the pin to move the pin between an extended position and a retracted position. In the extended position, an end of the pin is configured to extend into a telescope channel formed in the jacket to facilitate limited telescoping movement of the steering column, and in the retracted position, the end of the pin is located outside the telescope channel.

20 Claims, 9 Drawing Sheets

TELESCOPING STEERING COLUMN

FIELD OF THE INVENTION

The following description relates to a steering column assembly, and in particular, an adjustable steering column assembly with a telescope stop feature.

BACKGROUND

Some steering columns may be adjustable in a rake direction and a telescope direction. A traditional adjustable steering column includes a jacket clamp positioned about a steering column jacket and configured to apply a clamping force to the steering column jacket to prevent adjustment of the steering column in the telescope direction. In addition, a traditional adjustable steering column may include a rake clamp configured to apply a clamping force to the jacket clamp and/or steering column jacket to prevent adjustment of the steering column in the rake direction. The adjustable steering column is in a locked condition with the telescope clamp and the rake clamp respectively apply clamping forces to prevent adjustment of the adjustable steering column in the rake and telescope directions. The adjustable steering column is in an unlocked condition when respective clamping forces from the telescope clamp and the rake clamp are released so that the steering column may be adjusted.

The steering columns may include a lever actuated between a first position corresponding to the locked condition of the adjustable steering column and a second position corresponding to the unlocked condition of the adjustable steering column. However, some steering columns may inhibit travel during an impact event such as a crash event. Accordingly, it is desirable to provide a steering column to limit travel during telescope travel while also enabling travel during an impact event.

SUMMARY OF THE INVENTION

In one exemplary embodiment of the present invention, a telescope stop assembly for a steering column having a jacket is provided. The assembly includes a cam having a cam surface, the cam rotatable between a locked position and an unlocked position, and a pin operatively associated with the cam. The cam surface acts on the pin to move the pin between an extended position and a retracted position. In the extended position, an end of the pin is configured to extend into a telescope channel formed in the jacket to facilitate limited telescoping movement of the steering column, and in the retracted position, the end of the pin is located outside the telescope channel.

In another exemplary embodiment of the present invention, a steering column assembly is provided. The assembly includes a steering column, a jacket comprising a rake bolt channel and a telescope channel formed therein, and a cam having a cam surface, the cam rotatable between a locked position and an unlocked position. The assembly further includes a pin operatively associated with the cam, the cam surface acting on the pin to move the pin between an extended position and a retracted position. An end of the pin extends into the telescope channel in the extended position and the end of the pin is located outside the telescope channel in the retracted position.

In yet another exemplary embodiment of the present invention, a method of assembling a telescope stop assembly for a steering column having a jacket is provided. The method includes providing a cam having a cam surface, the cam rotatable between a locked position and an unlocked position, providing a pin, and operatively associating the pin with the cam such that the cam surface acts on the pin to move the pin between an extended position and a retracted position. An end of the pin is configured to extend into a telescope channel formed in the jacket in an extended position, and the end of the pin is located outside the telescope channel in the retracted position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
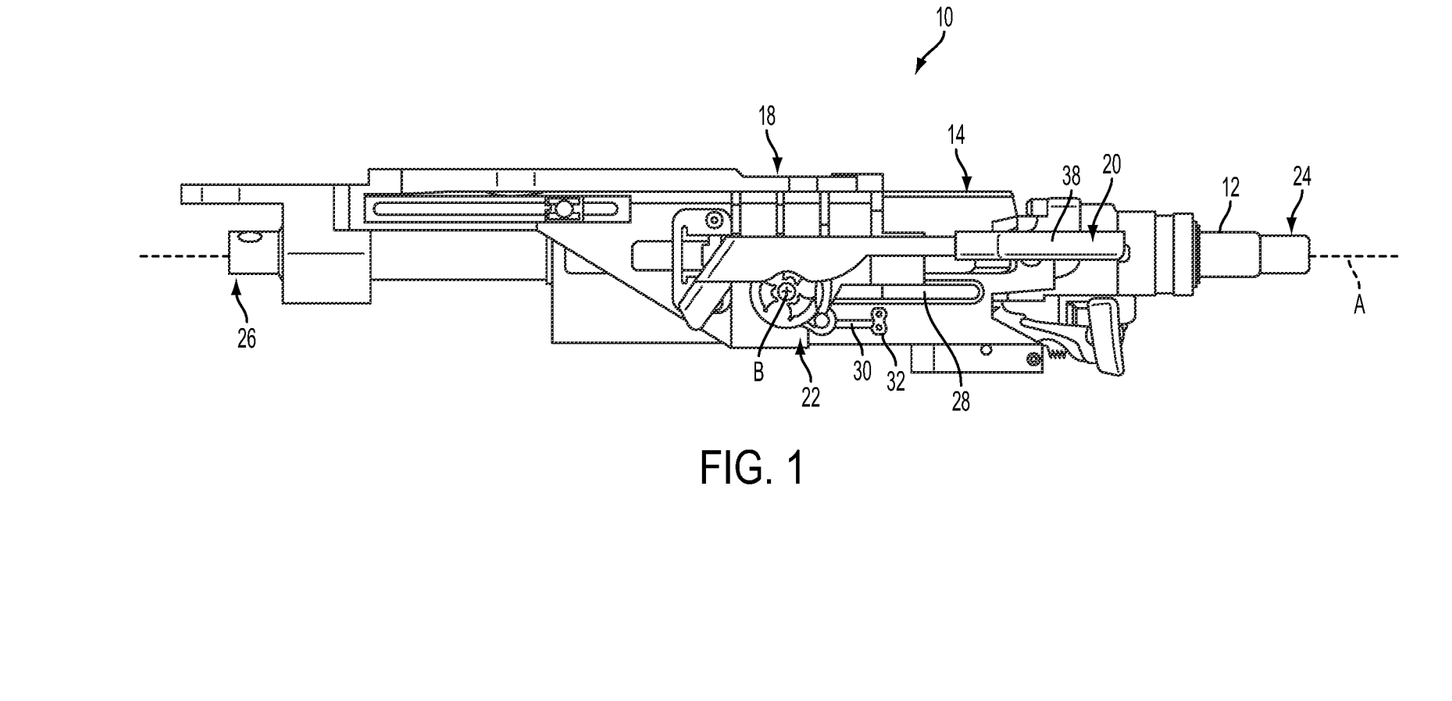
FIG. 1 is a side view of a steering column assembly according to an exemplary embodiment of the present invention.
Figure 2:
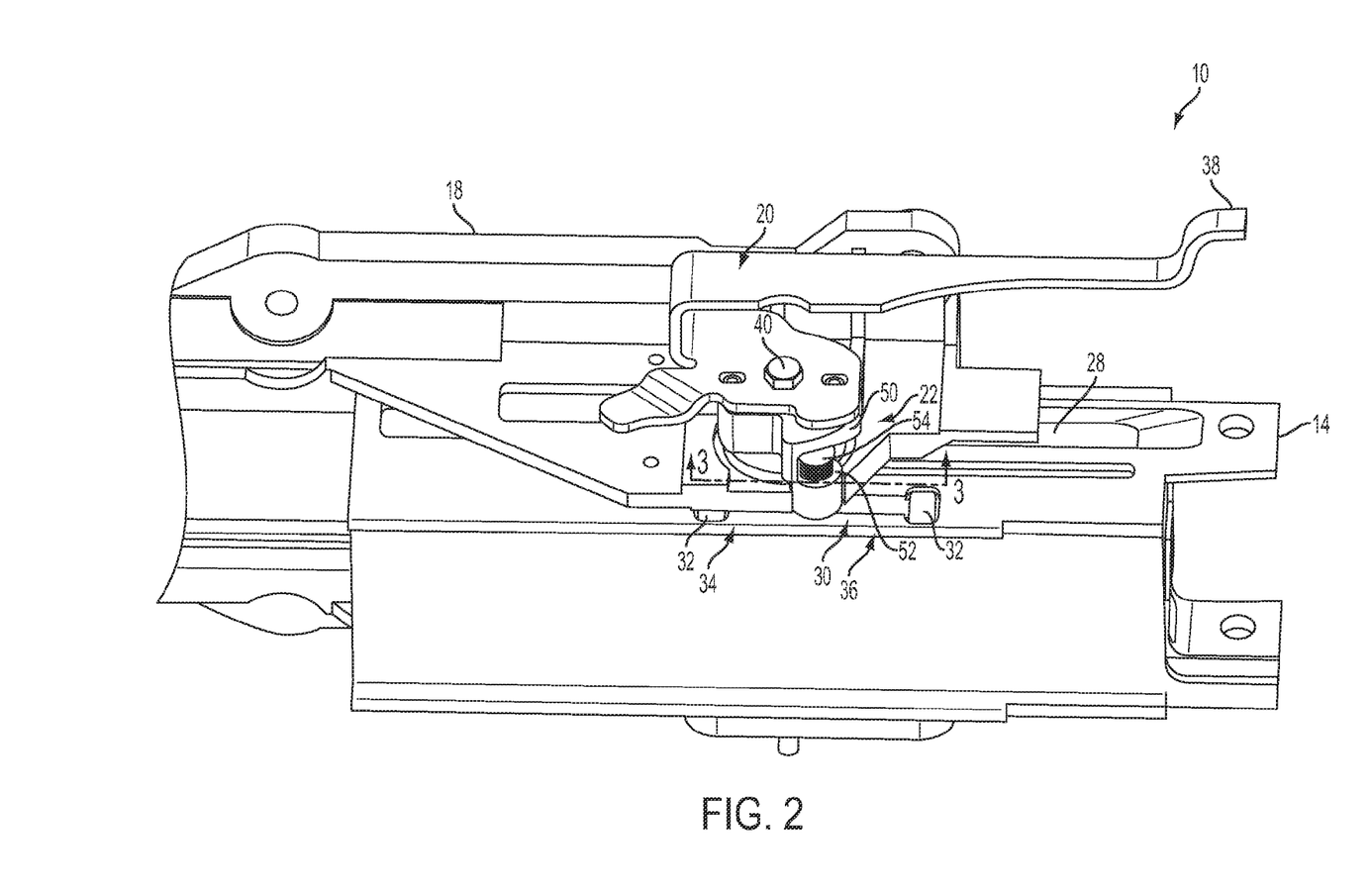
FIG. 2 is a perspective view of a portion of the assembly shown in FIG. 1 in a locked position.
Figure 3:
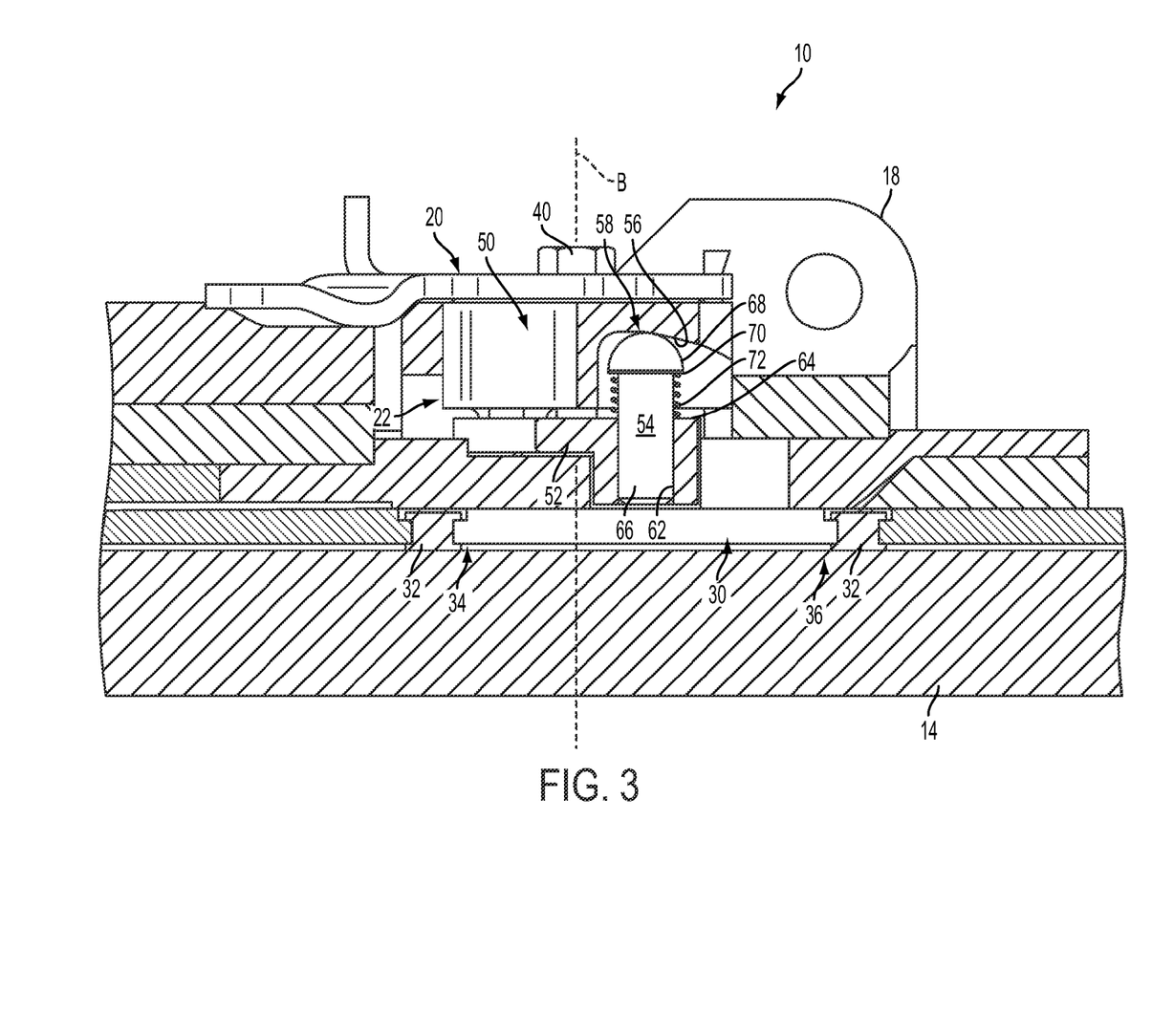
FIG. 3 is a cross-sectional view of the assembly shown in FIG. 2 and taken along line 3-3.
Figure 4:
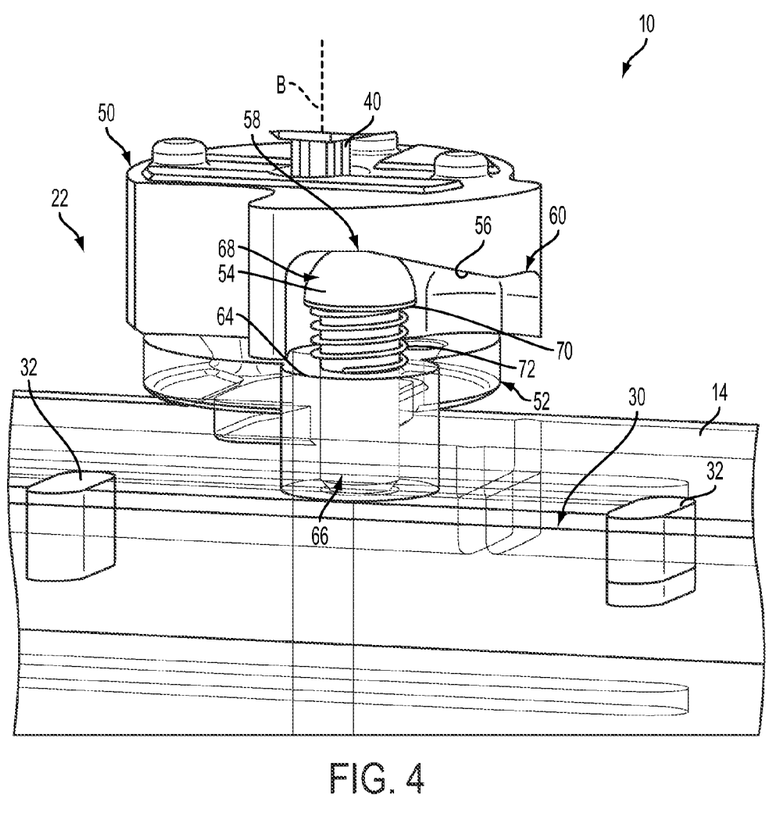
FIG. 4 is a perspective view of a portion of the assembly shown in FIG. 1 in the locked position.
Figure 5:
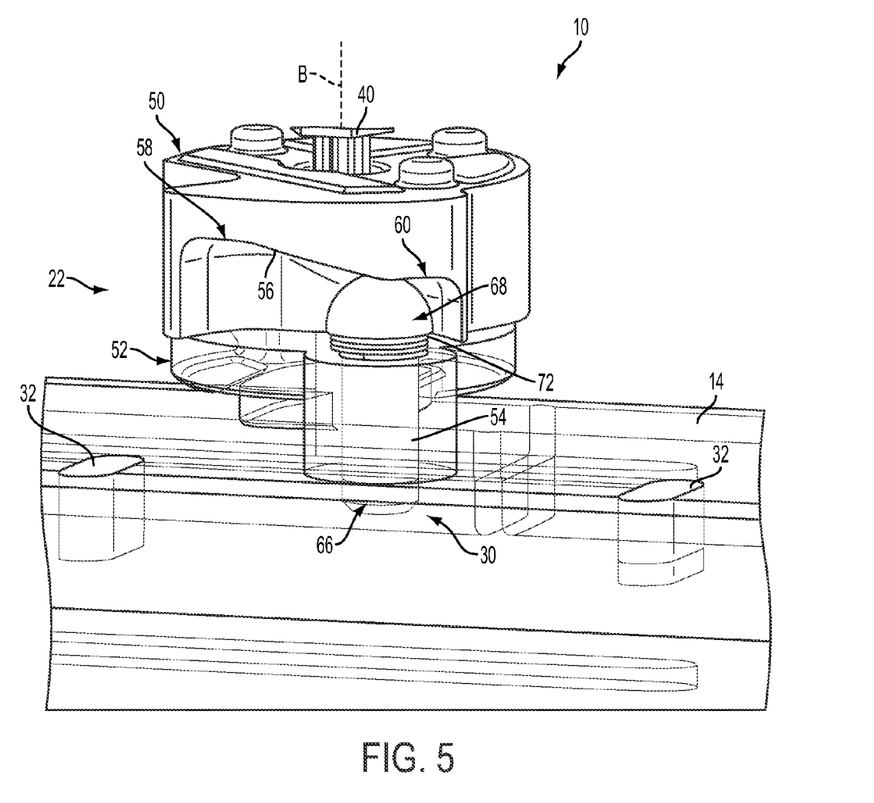
FIG. 5 is a perspective view of the assembly shown in FIG. 4 in an unlocked position.

Referring now to the Figures, where the invention will be described with reference to specific embodiments, without limiting same, FIG. 1 is a side view of an adjustable steering column assembly 10 according to an exemplary embodiment of the present invention. FIGS. 2-4 illustrate a portion of adjustable steering column assembly 10 in a locked position, and FIG. 5 illustrates a portion of adjustable steering column assembly 10 in an unlocked position. With reference to FIG. 1, adjustable steering column assembly 10 generally includes a steering shaft 12, an upper jacket 14 positioned about shaft 12, a support bracket 18, an actuating lever 20, and a telescope stop assembly 22. In an exemplary embodiment, adjustable steering column assembly 10 is adjustable in a rake direction and a telescope direction.

Steering shaft 12 extends along an axis 'A', and a steering wheel (not shown) is attached to an end 24 of shaft 12 while the other end 26 of shaft 12 is coupled to a steering gear (not shown). Upper jacket 14 surrounds and supports shaft 12 via bearings (not shown) disposed between shaft 12 and upper jacket 14. In an exemplary embodiment, upper jacket 14 extends coaxially with steering shaft 12, which is rotatably connected to upper jacket 14. As shown in FIG. 2, upper jacket 14 includes a rake bolt channel 28 and a telescope channel 30. In the exemplary embodiment, telescope channel 30 is operatively associated with telescope stop assembly 22 and includes a bumper or stop 32 positioned at each end 34, 36 of telescope channel 30.

Support bracket 18 is coupled to the vehicle and is configured to selectively apply or release a clamping force to upper jacket 14. Steering shaft 12 is axially retained within upper jacket 14, and with the clamping force applied to upper jacket 14, steering shaft 12 and upper jacket 14 are secured against adjustment in the telescope direction. With the clamping force released from upper jacket 14, shaft 12 and upper jacket 14 may be adjusted in the telescope direction. However, interaction between telescope stop assembly 22 and telescope channel 30 limits the amount of travel in the telescope direction, as described herein in more detail.

Actuating lever 20 includes a handle portion 38 (FIG. 2) and is rotatable about an axis 'B' (FIG. 1). A rake bolt 40 extends along axis 'B' and is coupled to actuating lever 20 to rotate therewith. Actuating lever 20 is rotatable between a locked position (FIGS. 2-4) to initiate the clamping force to upper jacket 14 and an unlocked position (FIG. 5) to release the clamping force to upper jacket 14. When in the locked position, shaft 12 is secured against telescoping adjustment. However, during an impact event (e.g., a crash event), telescope stop assembly 22 facilitates collapse and movement of upper jacket 14, which may be operatively associated with an energy absorption device (e.g., a roll strap) to dissipate energy of an impact on steering column assembly 10.

As shown in FIGS. 2-4, telescope stop assembly 22 generally includes an upper cam 50, a lower cam 52, and a telescope stop pin 54. Upper cam 50 includes a ramped cam surface 56 formed therein, and the depth of cam surface 56 decreases from a first end 58 of cam surface 56 to a second end 60 of cam surface 56 (see FIG. 5). As such, upper cam includes an inclined surface 56 between first end 58 and second end 60. Upper cam 50 receives rake bolt 40 therethrough and rotates about axis 'B' with rake bolt 40 when lever 20 is rotated.

Lower cam 52 is coupled to support bracket 18 and is fixed from rotation about axis 'B' (see FIG. 2). Lower cam 52 includes a pin aperture 62 (FIG. 3) formed through an upper surface 64 thereof, which is configured to receive pin 54. In the exemplary embodiment, pin 54 includes a first end 66 and a rounded second end 68, which defines a shoulder 70. A biasing mechanism 72 (e.g., a spring) is positioned about pin 54 and abuts against cam upper surface 64 and shoulder 70 to bias pin second end 68 against cam surface 56.

In operation, when lever 20 is in the locked position (FIGS. 2-4), upper cam 50 is positioned such that cam surface first end 58 is oriented over pin second end 68. As such, due in part to biasing mechanism 72, pin 54 is in a retracted position (i.e., pin first end 66 does not extend into telescope channel 30). In the locked position, shaft 12 is secured against telescoping movement. However, with pin 54 not positioned within telescope channel 30, shaft 12 and upper jacket 14 may collapse or move along axis 'A' during a crash event (rake bolt 40 travels along rake bolt channel 28 as upper jacket 14 collapses forward).

When lever 20 is moved to the unlocked position (FIG. 5), upper cam 50 is rotated via bolt 40, and pin second end 68 travels along cam surface 56 from first end 58 to second end 60. As the depth of cam surface 56 decreases, pin 54 is forced downward against biasing mechanism 72 until cam surface second end 60 is oriented over pin second end 68. As such, due to ramped cam surface 56, pin 54 is in an extended position (i.e., pin first end 66 extends into telescope channel 30). With lever 20 in the unlocked position and pin 54 within channel 30, upper jacket 14 (and steering shaft 12) may be adjusted in the telescope direction. However, telescoping travel distance is limited by stops 32 at either end 34, 36 of telescope channel 30.

Figure 6:
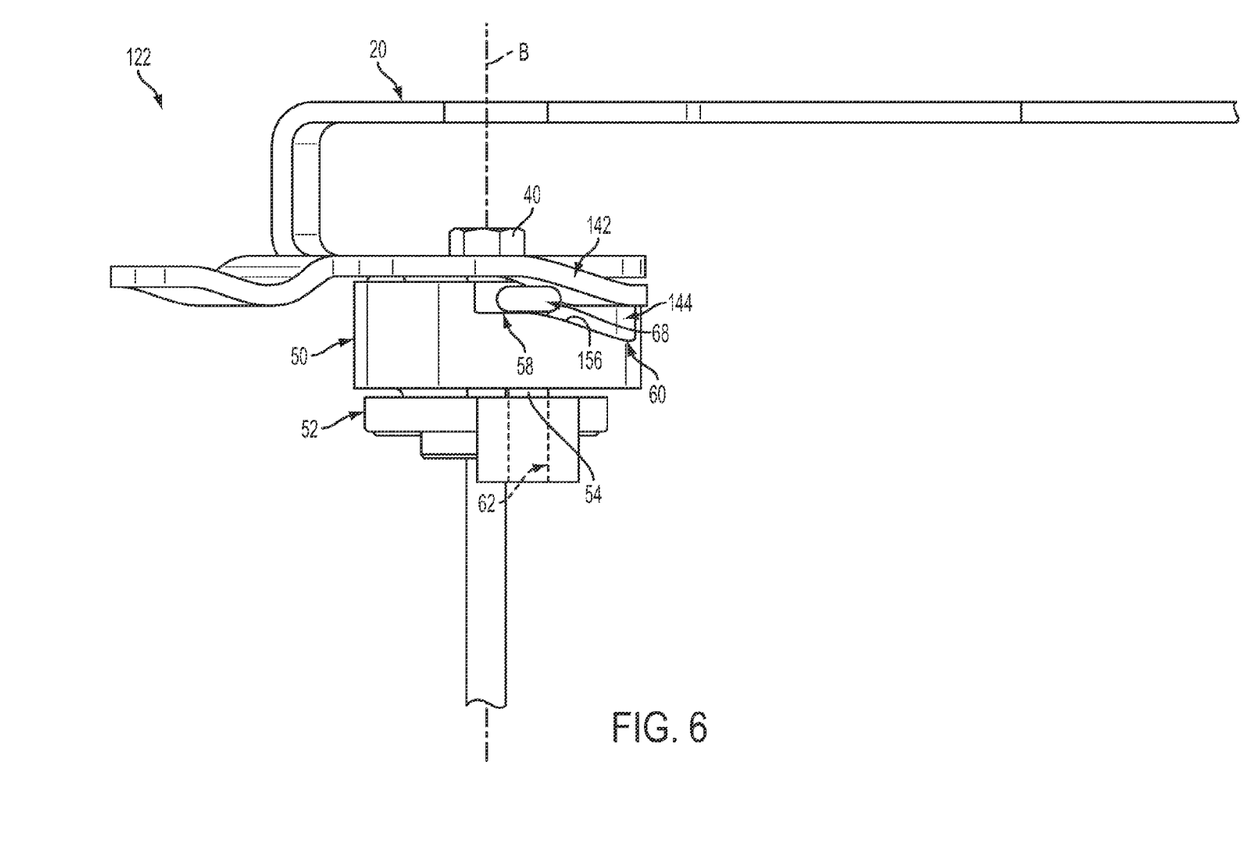
FIG. 6 is a side view of a portion of a steering column assembly according to another exemplary embodiment of the present invention, the assembly in a locked position.
Figure 7:
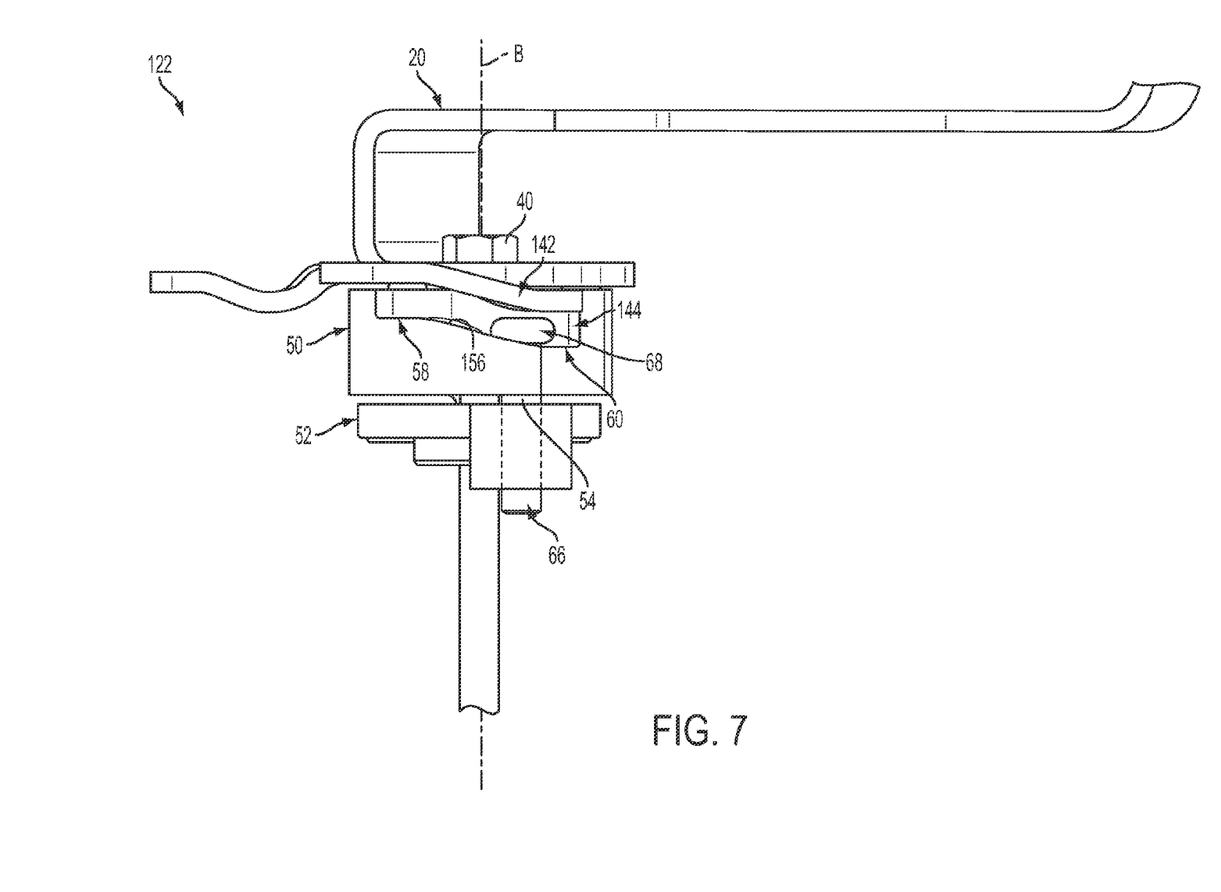
FIG. 7 is a side view of the assembly shown in FIG. 6 in an unlocked position.

FIGS. 6 and 7 illustrate a telescope stop assembly 122 that is similar to telescope stop assembly 22 except lever 20 includes a ramped flange 142 and upper cam 50 includes a ramped cam surface 156. Flange 142 is oriented proximate cam surface 156 to define a cam channel 144 therebetween, and pin second end 68 translates along cam channel 144 as lever 20 and upper cam 50 are rotated. As such, pin 54 is in the retracted position when pin second end 68 is positioned at cam surface first end 58 (FIG. 6), and pin 54 is in the extended position when pin second end 68 is positioned at cam surface second end 60 (FIG. 7).

Figure 8:
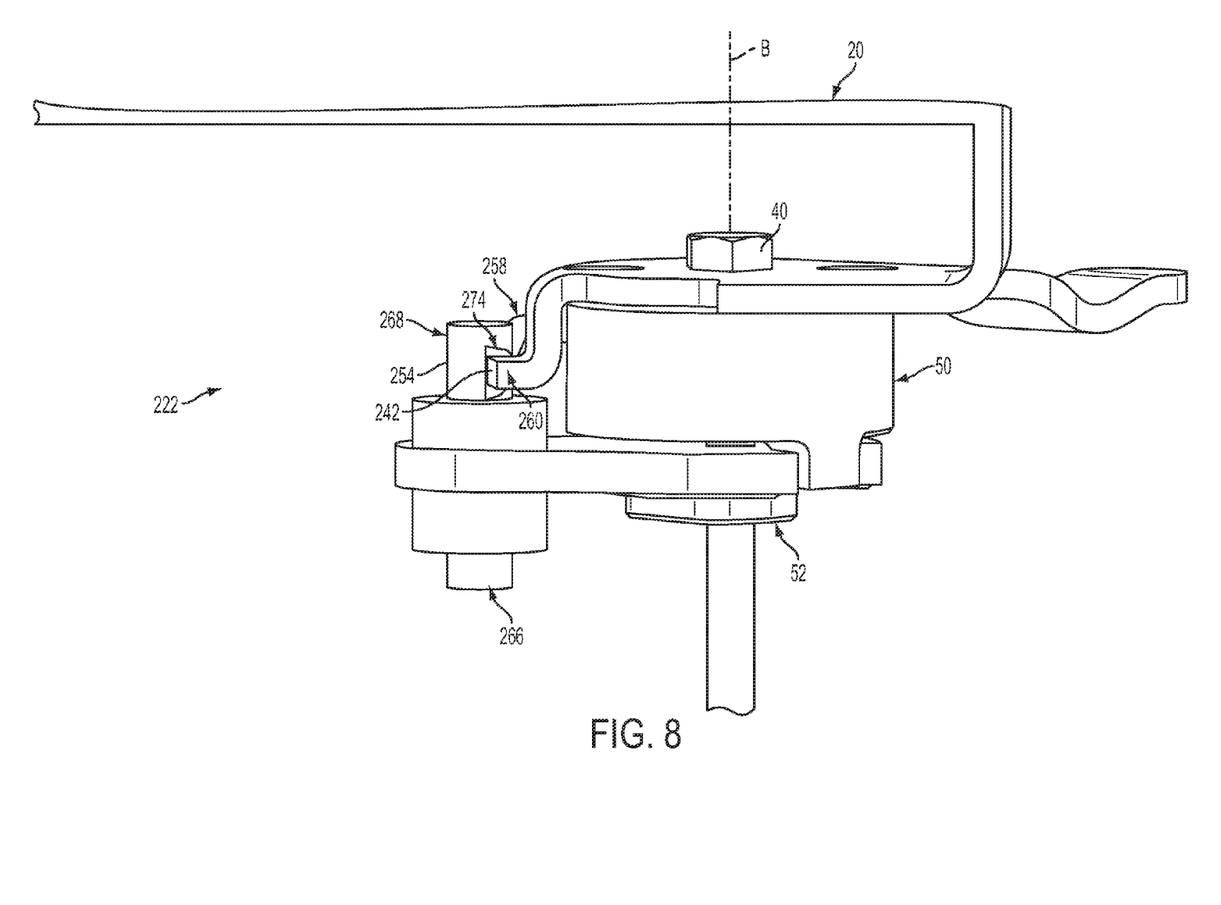
FIG. 8 is a side view of a portion of a steering column assembly according to another exemplary embodiment of the present invention, the assembly in an unlocked position.
Figure 9:
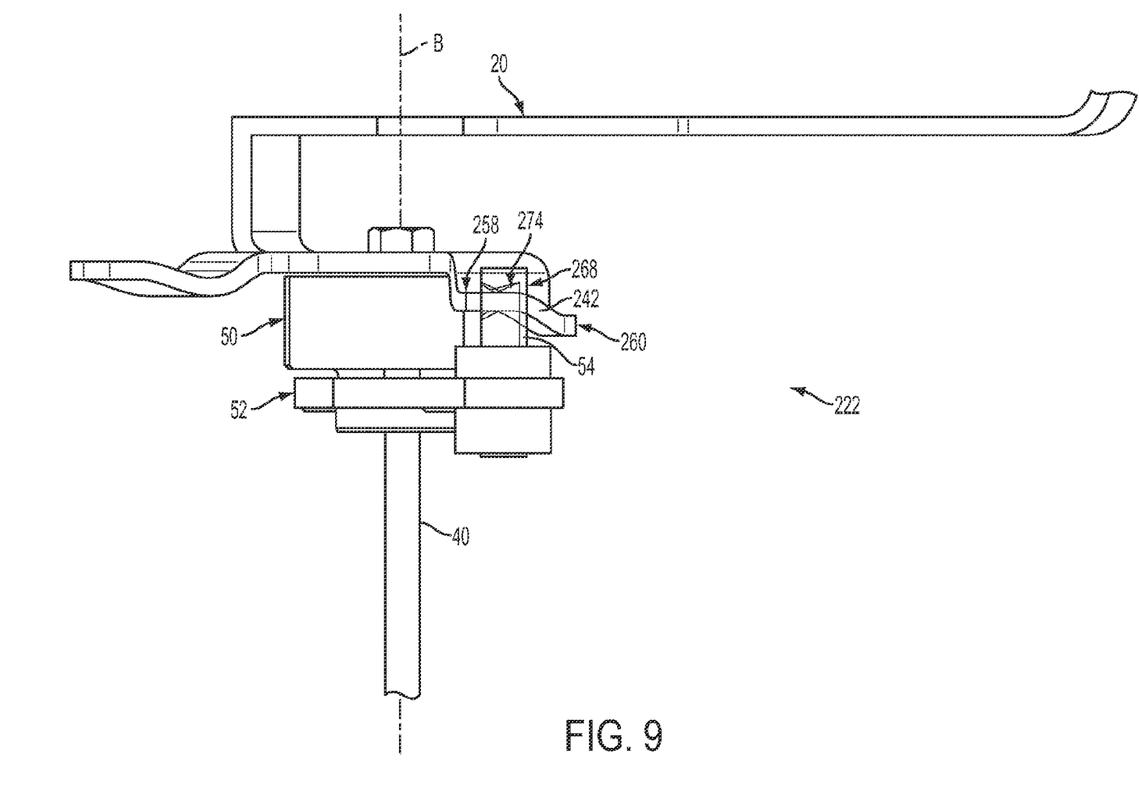
FIG. 9 is a side view of the assembly shown in FIG. 8 in a locked position.

FIGS. 8 and 9 illustrate a telescope stop assembly 222 that is similar to telescope stop assembly 22 except lever 20 includes a ramped flange 242 that acts as a cam surface, and a pin 254 is operatively associated with ramped flange 242. Pin 254 includes a first end 266 configured for extension into telescope channel 30 and a second end 268 that includes a recess or notch 274 configured to receive flange 242 (see FIG. 8). Pin second end 268 rides along ramped flange 242 as lever 20 is rotated. As such, pin 254 is in the retracted position when pin second end 268 is positioned at a first end 258 of ramped flange 242 (FIG. 9), and pin 254 is in the extended position when pin second end 268 is positioned at a second end 260 of ramped flange 242 (FIG. 8).

A method of assembling telescope stop assembly 22, 122, 222 includes providing cam 50, 20 having ramped cam surface 56, 156, 242, providing pin 54, 254, and providing second cam 52. Pin 54, 254 is inserted through second cam 52 and a portion of pin 54, 254 is operatively associated with cam surface 56, 156, 242 such that pin 54, 254 is movable between an extended position and a retracted position. Rake bolt 40 may be inserted through lever 20, cam 50, and cam 52 to rotatably couple lever 20 and cam 50.

Described herein are systems and methods for limiting steering column travel during telescope movement while enabling column travel during a crash event. A steering column assembly includes a telescope stop assembly that extends a pin into a telescope channel when the column assembly is in an unlocked position that enables telescoping movement. The telescoping movement is limited by the distance the pin can translate along the telescope channel. The pin is subsequently retracted from the telescope channel when the column assembly is moved to a locked position. At this point, although the steering column assembly is secured from telescoping movement in the locked position, because the pin is retracted from the channel, a large enough force during a crash event will cause telescope movement. The force of the crash may then be dissipated with a secondary system. As such, the described steering column assembly limits telescope travel, but will not inhibit telescope travel during a defined impact event.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A telescope stop assembly for a steering column having a jacket, the assembly comprising:
   a cam having a cam surface, the cam rotatable between a locked position and an unlocked position; and
   a pin operatively associated with the cam, the cam surface acting on the pin to move the pin between an extended position and a retracted position, wherein in the extended position an end of the pin is configured to extend into a telescope channel formed in the jacket to facilitate limited telescoping movement of the steering column, and in the retracted position the end of the pin is located outside the telescope channel.

2. The assembly of claim 1, further comprising a lower cam having an aperture to receive the pin.

3. The assembly of claim 1, wherein the cam surface is ramped.

4. The assembly of claim 1, wherein the cam surface is a flange and the pin includes a recess to receive the flange.

5. The assembly of claim 4, wherein the cam is a lever, configured to facilitate telescoping movement of the steering column when the lever is in the unlocked position.

6. The assembly of claim 1, further comprising a lever having a flange positioned proximate the cam surface to define a cam channel therebetween, a portion of the pin positioned within the cam channel to translate along the cam channel.

7. The assembly of claim 1, further comprising a biasing mechanism biasing the pin against the cam surface.

8. The assembly of claim 7, further comprising a lower cam configured to receive the pin, wherein the biasing mechanism is positioned about the pin between the cam and the lower cam.

9. A steering column assembly comprising:
   a steering column;
   a jacket comprising a rake bolt channel and a telescope channel formed therein;
   a cam having a cam surface, the cam rotatable between a locked position and an unlocked position; and
   a pin operatively associated with the cam, the cam surface acting on the pin to move the pin between an extended position and a retracted position, an end of the pin extending into the telescope channel in the extended position and the end of the pin is located outside the telescope channel in the retracted position.

10. The assembly of claim 9, further comprising a lower cam having an aperture to receive the pin.

11. The assembly of claim 9, wherein the cam surface is inclined.

12. The assembly of claim 9, wherein the cam surface is a flange and the pin includes a recess to receive the flange.

13. The assembly of claim 12, wherein the cam is a lever to prevent telescoping movement of the steering column when the lever is in the locked position.

14. The assembly of claim 9, further comprising a lever having a flange positioned proximate the cam surface to define a cam channel therebetween, a portion of the pin positioned within the cam channel to translate along the cam channel.

15. The assembly of claim 9, further comprising a biasing mechanism biasing the pin against the cam surface.

16. The assembly of claim 15, further comprising a lower cam configured to receive the pin, wherein the biasing mechanism is positioned about the pin between the cam and the lower cam.

17. The assembly of claim 9, further comprising a rake bolt extending through the cam and the rake bolt channel, the cam configured to rotate with the rake bolt.

18. A method of assembling a telescope stop assembly for a steering column having a jacket, the method comprising:
   providing a cam having a cam surface, the cam rotatable between a locked position and an unlocked position;
   providing a pin; and
   operatively associating the pin with the cam such that the cam surface acts on the pin to move the pin between an extended position and a retracted position, an end of the pin configured to extend into a telescope channel formed in the jacket in an extended position, the end of the pin located outside the telescope channel in the retracted position.

19. The method of claim 18, further comprising providing a lower cam having an aperture and inserting the pin into the aperture.

20. The method of claim 18, further comprising providing the cam surface as a inclined cam surface.

* * * * *